Figure 1:
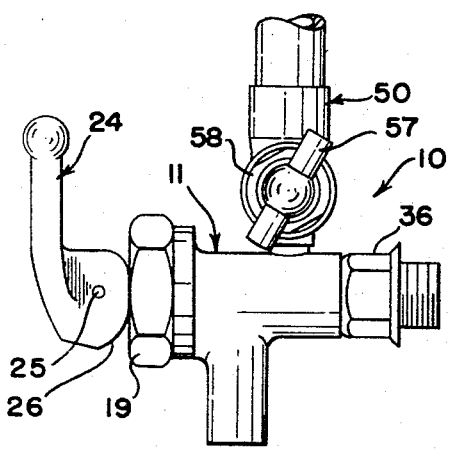

May 30, 1967  E. J. GIESE ET AL  3,322,151
FLUID MIXING VALVE HAVING A FLOW METERING INSERT
Filed April 23, 1964  2 Sheets-Sheet 1

INVENTORS.
ELROY J. GIESE &
GILBERT T. DELLY
BY
*Fay & Fay*
ATTORNEYS

May 30, 1967 E. J. GIESE ET AL 3,322,151

FLUID MIXING VALVE HAVING A FLOW METERING INSERT

Filed April 23, 1964 2 Sheets-Sheet 2

INVENTORS.
ELROY J. GIESE &
GILBERT T. DELLY
BY
*Fay & Fay*
ATTORNEYS

United States Patent Office 3,322,151
Patented May 30, 1967

3,322,151
FLUID MIXING VALVE HAVING A FLOW METERING INSERT
Elroy J. Giese, Cleveland, and Gilbert T. Delly, Maple Heights, Ohio, assignors to Tomlinson Industries, Inc., Cleveland, Ohio, a corporation of Ohio
Filed Apr. 23, 1964, Ser. No. 362,139
6 Claims. (Cl. 137—625.4)

This invention relates to valves in general and more particularly to a mixing valve for dispensing liquid food.

The primary object of this invention is to provide a valve which will be used in connection with the dispensing of coffee, chocolate, fruit drink, soft drinks, and the like. Each of these applications involves a situation in which an appropriate liquid concentrate, either coffee, chocolate, fruit, or soft drink syrup, is mixed either with a base liquid such as hot water, milk or carbonated soda of one sort or another. It is contemplated that, by utilization of the principles of this invention, the mixing of the concentrate with the base liquid will be accomplished in accurate proportions by actuation of a single flow control handle.

It has been the custom in the past to utilize two different types of systems in feeding the liquid concentrate to the base material. Thus, for applications such as coffee urns, a gravity feed system has been utilized in which the only pressure acting upon the concentrate is gravity. Accordingly, the concentrate in such a system is stored in a reservoir and, as the level of concentrate in the reservoir diminishes, the rate of flow of the concentrate through the concentrate passage will vary depending upon the level of the concentrate in the reservoir. Such a situation has resulted in a wide variation in the quality of drinks dispensed by such an apparatus. The other type of fluid system commonly used is exemplified by the soft drink dispensers which entail a pressurized system instead of the gravity feed system mentioned above. In such a system, the liquid level of the concentrate does not significantly affect the magnitude of the flow rate of the concentrate through the concentrate passage. However, it is necessary to provide some means whereby the ratio of the concentrate to the base liquid may be controlled so that a proper quality of drink may be dispensed.

It is an object of this invention to provide a mixing valve adapted to be used either in a gravity feed system or a pressurized system.

It is a further object of this invention to provide a valve whereby the flow of liquid concentrate in a gravity system may be adjusted to compensate for the decrease of the concentrate level in the reservoir.

It is a further object of this invention to provide a mixing valve whereby the flow rate of the concentrate in a pressurized system may be pre-set with accuracy.

It is another object of this invention to provide a flow control insert adapted to be received in a mixing valve whereby the flow of concentrate and the flow of base liquid may be accurately controlled.

Other objects and features of the invention will become more apparent upon a complete reading of the specification.

The above and related objects are accomplished by a valve arrangement in which a metal sleeve is pressed into the body such that one end of the sleeve is flush with the sealing seat. The sleeve includes a tapered, axial, radially inwardly converging rib which communicates with a laterally oriented drilled hole in the body. The concentrate to be mixed is fed through the drilled hole into the chamber formed by the outwardly opening rib and the body wall and flows out of the valve when the diaphragm is displaced from the sealing seat. Simultaneous with the flow of the concentrate, the particular base liquid, such as hot water, soda, milk or other appropriate liquid, is fed through the inlet of the valve and when the valve is open, the flow mixes with the concentrate flowing through the concentrate passage so that the ultimate discharge from the faucet is a mixture of concentrate and base liquid. The flow rate of concentrate through the passage may be controlled by two factors—the size of the axial rib and the position of a throttle valve which is mounted in communication with the laterally drilled hole in the faucet body.

To the accomplishment of the foregoing and related ends and features, said invention then consists of the means more fully described hereinafter and particularly pointed out in the claims, the following description setting forth in detail one approved means of carrying out the invention, such disclosed means, however, constituting but one of the various ways in which the principles of the invention may be used.

Figure 2:
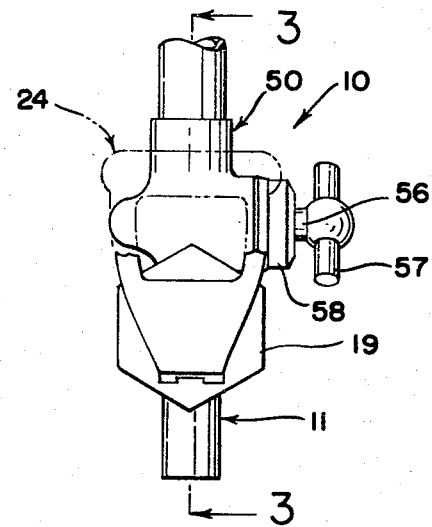
Figure 3:
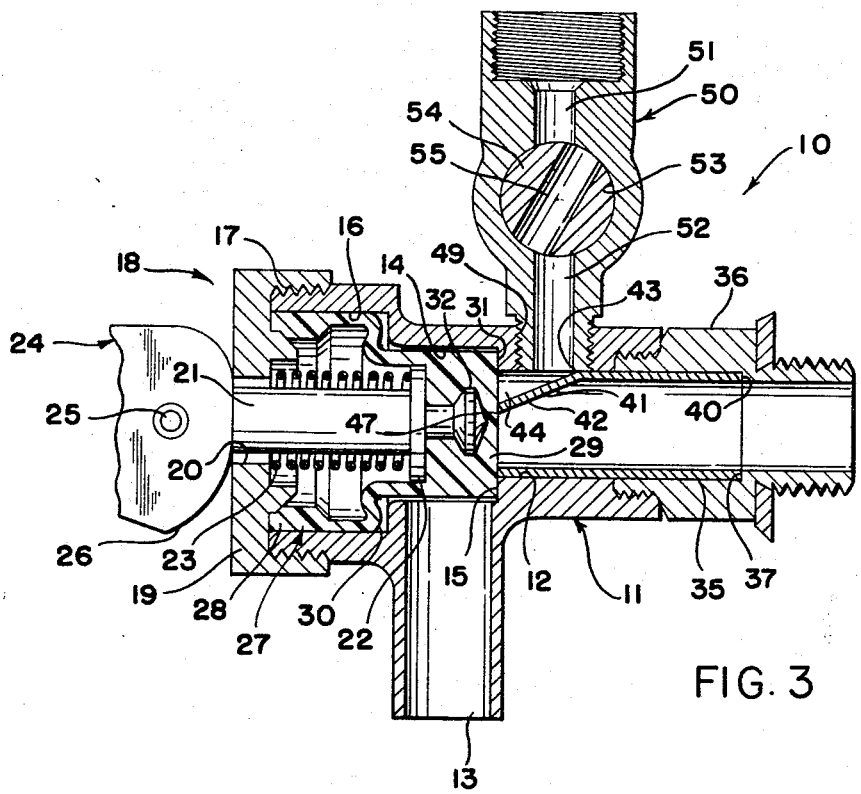
Figure 4:
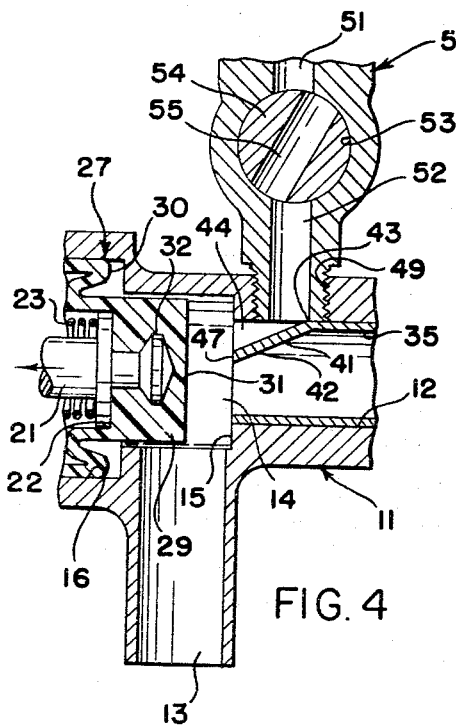
Figure 5:
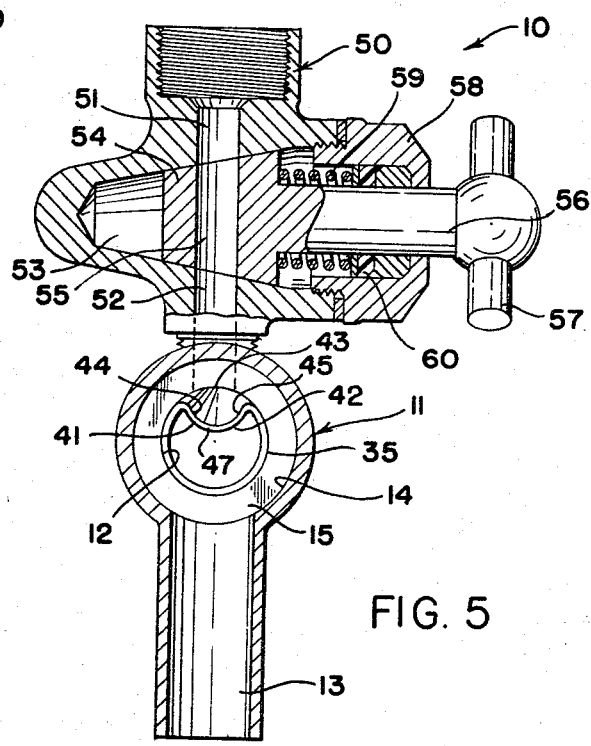
Figure 6:
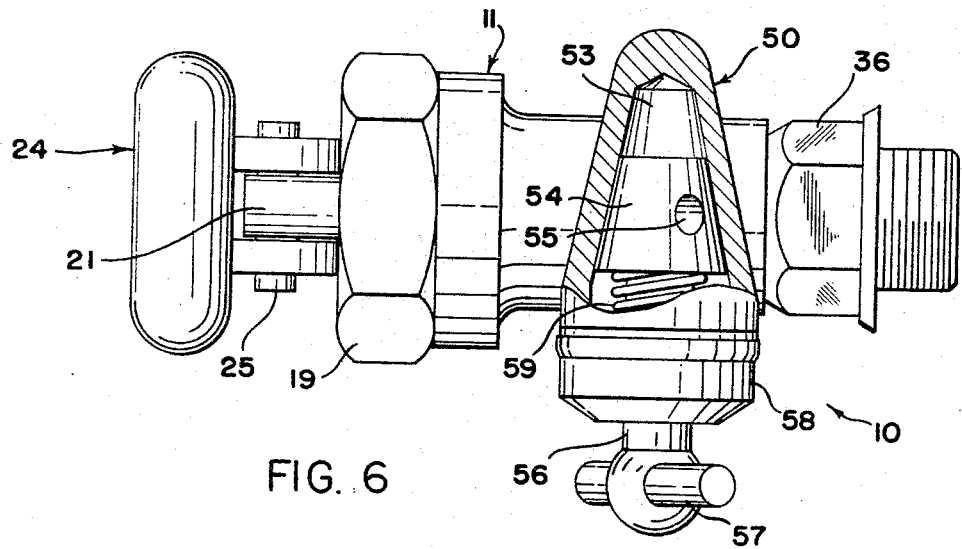

In the drawings wherein like reference numerals indicate like parts in the various views:

FIG. 1 is a side elevation view of the valve embodying the principles of the instant invention.
FIG. 2 is an end elevation view of FIG. 1.
FIG. 3 is a view taken along lines 3—3 of FIG. 2.
FIG. 4 is a view similar to FIG. 3 showing the valve in open position.
FIG. 5 is a sectional view showing the sleeve insert and the throttling valve.
FIG. 6 is a plan view, partly in section, of the mixing valve of FIG. 1.

Referring to the drawings wherein the preferred embodiment of the invention is illustrated, there is shown in FIG. 1 a valve assembly, indicated generally by the reference numeral 10, which incorporates the principles of the instant invention. The valve assembly 10 includes a body 11 having an inlet passage 12 and an outlet passage 13. A fluid passageway 14 is provided in the valve body 11, the former being in communication with inlet and outlet passages 12 and 13 respectively. The passageway 14 comprises a sealing seat 15 which is oriented transversely of the axis of the inlet 12. Approximately coaxial with the inlet 12 and joining the passageway 14 is a cylindrical chamber 16 which cooperates with the passageway 14 to form a seal receiving chamber.

The body 11 is threaded on its outer periphery at its upper extremity 17 to receive a threaded cap assembly 18. The cap assembly comprises a bonnet member 19 having a central opening 20 through which is slidably received a stem 21. The stem 21 has a collar 22 which provides an abutment for a compression spring 23. The opposite end of the spring 23 abuts the bonnet member 19 normally to urge the stem toward the seat 15. A handle 24 is attached to the stem by suitable pivot pin means indicated at 25. The handle includes an arcuate cam portion 26 which, as the handle 24 is rocked about the pin 25, coacts with the exterior surface of the bonnet 19 to wthdraw the stem 21.

Disposed in the passageway 14 and the cylindrical portion 16 is a valve seal or seat cup, indicated generally by the reference numeral 27. The seal includes a tubular base portion 28, a tubular nipple portion 29, and a transverse shoulder portion 30, which joins the base portion to the nipple portion. The tubular base portion is in close engagement with the inner periphery of the cylindrical portion 16 of the body 11. The nipple portion includes a transverse end wall 31 in which there is formed a recess adapted to receive the knob 32 of the stem 21. With the knob 32 snap fitted into the recess in the end wall, the nipple portion of the seal 27 is adapted to be reciprocated with the reciprocation of the stem 21. As is apparent from an inspection of FIG. 3, the spring 23 normally biases the stem 21 and the seat cup 27 to a position wherein the transverse end wall 31 is in abutment with the sealing seat formed by the shoulder 15 thereby isolating the inlet passage from the outlet passage and preventing the flow of fluid through the valve.

It is believed apparent that upon pivoting movement of the handle 24 about the pivot pin 25, the cam surface 26 will coact with the bonnet 19 to withdraw the stem 21 in a direction away from the sealing seat 15. Inasmuch as the seat cup 27 is secured to the stem 21, the cup will experience a corresponding withdrawal of the transverse end wall 31 from the sealing position in abutment against the shoulder 15. In the event of movement of the seat cup from the seat 15, fluid introduced through the inlet passage 12 will pass through the fluid passageway 14 into the outlet passage 13.

Received in the inlet passage 12 is a hollow, cylindrical insert or sleeve 35. The cylindrical or tubular sleeve 35 is of a diameter such that its external periphery closely fits with the interior periphery of the inlet passage 12. The sleeve 35 is retained in the inlet passage by a terminal extension 36 which is threaded to the inlet end of the valve body 11. The terminal extension 36 includes a transverse shoulder 37 which extends inwardly of the passageway 38 to an extent substantially equal to the thickness of the wall of the sleeve 35. With the tubular extension 36 threadedly attached to the valve body 11, the shoulder 37 abuts the end of the sleeve 35 and prevents displacement of the sleeve from the inlet passage 12.

The sleeve 35 comprises a tubular base portion 40 and an orifice defining portion 41. The orifice defining portion is comprised of an axial, radially inwardly directed rib 42. The rib defines a channel extending from a point 43 on the periphery of the sleeve and intermediate the ends of the sleeve and extending axially to one end of the sleeve. The channel is defined by side walls 44, 45 which cooperate with the wall of the inlet passage 12 to complete the enclosure. The inward depression of the rib 42 serves to restrict the outlet end of the sleeve 35 and thereby forms an orifice or metering port for the inlet passage 12.

Threadedly received in an aperture 49 formed in the wall of the inlet passage 12 is a secondary valve body 50 having auxiliary inlet and outlet passages 51, 52 respectively. Extending transversely of the passages in the valve body 50 is a valve chamber 53 in which there is received a throttling valve plug 54 having a passage 55 passing therethrough. The plug 54 is integral with a stem 56 having an actuating handle 57. The stem passes through an aperture in a cap member 58 which is threadedly secured to the valve body 50 and forms a closure for the transverse valve chamber 53. A spring 59 is interposed between the plug 54 and a seal 60 received in the cap with the spring serving to bias the valve 54 away from the cap 58. The plug and the chamber 53 are formed with tapering sides and the spring 59 biases the truncated conical plug toward the apex of the conical valve chamber 53 so that the plug passage 55 is in alignment with the inlet and outlet passages 51, 52. Upon rotation of the plug 54 in the chamber 53, the passage 55 may be aligned with the inlet and outlet passages to permit the flow of fluid through the secondary valve device.

It may be seen that, with the mechanism above described, the fluids introduced through the inlet 12 of the valve 10 and the inlet 51 of the secondary valve, assuming the plug 54 to be in a position permitting fluid flow, will both be controlled by the transverse end wall 31 of the seat cup 27. Upon removal of the end wall 31 from the sealing seat 15, the respective fluids will be combined in the passageway 14 of the valve body 11 and thereafter pass outwardly of the valve mechanism through the outlet passage 13. By rotation of the plug 54 to positions such as illustrated in FIG. 3, the quantity of fluid permitted to pass through the secondary valve 50 may be controlled. Thus, as a concrete example, a liquid concentrate of coffee, for example, introduced into the inlet passage 51 in a gravity feed system may be mixed with hot water introduced through the inlet passage 12 whereby a mixture of coffee and water will be dispensed from the outlet passage or faucet 13. The strength of the mixture may be varied by adjusting the position of the plug 54 so that more or less of the liquid concentrate may be mixed with a given amount of hot water entering through the inlet passage 12. As the quantity of concentrate in the reservoir decreases, the valve 54 may be adjusted to compensate for the loss of head so that a uniform mixture of coffee and water may be obtained at all times.

The control of the mixture of base liquid and concentrate may also be effected by the particular design of the metering sleeve 35. It is to be noted that, theoretically, the quantity of fluid passing through the sleeve 35 is constant under steady state conditions and is not affected by the area of the rib or the orifice. Thus, theoretically, a change in the area of the rib or the orifice would merely cause a change in velocity of the fluid with the quantity remaining constant. However, losses due to the converging and diverging configuration of the orifice and rib reduces the flow to a quantity which is less than the quantity obtainable under theoretical conditions. Moreover, with each change in configuration of the sleeve, a different flow will be obtained due to variations in the losses. Accordingly, the particular flow characteristics of a particular shape of sleeve must be determined thus providing a discharge coefficient which will indicate the metering effect of the particular sleeve. It is contemplated that a range of differently configured sleeves may be provided, each having a different discharge coefficient, so that the metering effect of the sleeve may be accurately selected.

Several features of the sleeve may be used to adjust the quantity of fluid permitted to pass through the sleeve. Thus, the size of the orifice 41 defined by the wall 46 and the depending edge 47 of the rib 42 will determine the quantity of liquid permitted to pass through the inlet passage 12 of the valve 11. Similarly, the size of the rib 42 will have a substantial effect on the quantity of fluid passing through the outlet passage 52 of the valve 50. Thus, the position of the point 43 axially on the sleeve 35 and its position relative to the outlet 52 when the sleeve is assembled in the valve will control, to some extent, the flow permissible through the outlet 52. That is, if the rib 42 is formed from a point 43 which is axially to the left of that illustrated in FIG. 4, the outlet passage 52 will be restricted to some extent and a smaller quantity of fluid will be permitted to flow therethrough. Similarly, if the angle on which the rib 42 is formed is decreased, a smaller quantity of fluid will pass through the passage 52. That is, as the angular deformation of the rib 42 approaches the formation of a uniformly cylindrical sleeve, a decreased quantity of fluid concentrate will pass through the channel. Additionally, the quantity of concentrate may be controlled by decreasing the space between the side walls 44, 45 such that the chord formed by the spacing of the walls is less than the diameter of the outlet passage 52 thereby causing the walls of the channel to restrict the flow of the concentrate.

It is, of course, important to remember that, as the size of the rib is adjusted to meter the flow of the concentrate, it is also necessary to take cognizance of the flow rate of the base liquid through the sleeve 35. Thus, merely decreasing the dimensions of the rib 42 to decrease the flow of concentrate may be inadequate to obtain a properly flavored drink inasmuch as the decrease in the rib size may constitute too much of an increase in the flow of the base liquid and thereby overcompensate in the adjustment of the mixture concentrate.

With utilization of the metering sleeve hereinabove described, it is believed apparent that the rib 42 on the sleeve performs a duality of functions. Thus, the rib provides a channel whereby the liquid concentrate may be delivered to the mixing area separate from the base liquid. Similarly, the rib performs a metering function in that it restricts the flow rate of the base liquid and the concentrate to a predetermined quantity. A further feature which is desirable in the sleeve arrangement is the turbulence of the fluid caused by the converging and diverging configuration. This turbulence enhances the mixing of the concentrate and the base liquid so that a more homogeneous product is obtained.

It is, of course, to be understood that the throttle valve, although useful as a compensator for the decreasing head in a gravity feed system, is not necessarily required in the combination when a pressure system is to be used. However, the throttle valve, which also has a discharge coefficient, may be useful even in the pressure system as a means of variably adjusting the flow rate of the concentrate in conjunction with the metering function performed by the metering sleeve 35.

For purposes of description, the principles of the invention have been set forth in connection with but a single illustrated embodiment. It is not our intention that the illustrated embodiment or the terminology employed in describing it be limiting inasmuch as variations in these may be made without departing from the spirit of the invention; but rather, it is our desire to be restricted only by the scope of the appended claims.

We claim:
1. A valve comprising:
   a valve body having inlet and outlet passages;
   a fluid passageway in the valve body interconnecting said passages;
   a seal chamber in the passageway;
   a sealing seat defined by the seal chamber transverse the axis of the passageway;
   resilient sealing means disposed in the seal chamber and adapted to abut said sealing seat;
   manually operable means secured to said resilient sealing means for controlling the movement of said resilient sealing means toward and away from abutment with said sealing seat;
   an auxiliary passageway in said valve body opening into said inlet passage;
   a sleeve received in the inlet passage;
   said sleeve extending longitudinally of the inlet passage to a point adjacent the sealing seat with one end coplanar with said seat;
   an axially extending recess defining a channel in a portion of the periphery of said sleeve;
   said channel extending from at least the point of intercommunication of said auxiliary passageway and said inlet passage to said one end of the sleeve;
   the other end of said sleeve being in sealing engagement with said inlet passage whereby fluid passing through said inlet passage flows only through the interior of said sleeve and fluid in the auxiliary passage flows through said channel.

2. The combination of claim 1 wherein said channel includes a radially inwardly tapering portion, with the radially innermost point being at said one end of said sleeve whereby the area of the passage through said sleeve at said one end is substantially less than the area of the passage through said sleeve at the opposite end.

3. The combination of claim 1 and further including a manually operable valve interposed in said auxiliary passageway whereby the flow of fluid through said auxiliary passage may be controlled.

4. The combination of claim 1 wherein the diameter of said inlet passage surrounding said portion of said sleeve is substantially equal to the outer diameter of said sleeve.

5. The combination of claim 1 wherein said other end of said sleeve is uniformly cylindrical in cross-section and has an outer diameter substantially the same as the diameter of said inlet passage.

6. The combination of claim 1 wherein said inlet passage has a transverse shoulder facing said sealing seat; said other end of said sleeve being in engagement with said shoulder.

References Cited
UNITED STATES PATENTS

| | | | |
|---|---|---|---|
| 665,357 | 1/1901 | Ackerman | 137—625.4 |
| 973,914 | 10/1910 | Caffery | 137—606 X |
| 3,104,089 | 9/1963 | Seltsam | 251—331 X |

FOREIGN PATENTS

| | | |
|---|---|---|
| 476,656 | 9/1951 | Canada. |
| 172,450 | 8/1960 | Sweden. |

WILLIAM F. O'DEA, *Primary Examiner.*

D. H. LAMBERT, *Assistant Examiner.*